(12) United States Patent
De Vleeschauwer et al.

(10) Patent No.: US 8,867,347 B2
(45) Date of Patent: Oct. 21, 2014

(54) METHOD AND APPARATUS FOR CONGESTION CONTROL

(75) Inventors: Danny De Vleeschauwer, Evergem (BE); Koenraad Laevens, Ghent (BE); Francois Baccelli, Meudon (FR); Dohy Hong, Fontenay sous Bois (FR)

(73) Assignee: Alcatel Lucent, Boulogne-Billancourt (FR)

( * ) Notice: Subject to any disclaimer, the term of this patent is extended or adjusted under 35 U.S.C. 154(b) by 288 days.

(21) Appl. No.: 13/378,901

(22) PCT Filed: Jun. 10, 2010

(86) PCT No.: PCT/EP2010/058120
§ 371 (c)(1),
(2), (4) Date: Mar. 2, 2012

(87) PCT Pub. No.: WO2010/145982
PCT Pub. Date: Dec. 23, 2010

(65) Prior Publication Data
US 2012/0155258 A1 Jun. 21, 2012

(30) Foreign Application Priority Data
Jun. 18, 2009 (EP) .................................... 09290462

(51) Int. Cl.
*G01R 31/08* (2006.01)
*H04L 12/911* (2013.01)
(Continued)

(52) U.S. Cl.
CPC .............. *H04L 47/10* (2013.01); *H04L 47/781* (2013.01); *H04L 12/5695* (2013.01); *H04L 47/724* (2013.01); *H04L 47/823* (2013.01); *H04L 47/822* (2013.01); *H04L 47/801* (2013.01); *H04L 47/19* (2013.01); *H04L 47/2416* (2013.01); *H04L 47/38* (2013.01); *H04L 47/127* (2013.01)
USPC .......................................... 370/230; 370/400

(58) Field of Classification Search
USPC .................... 370/370–390, 400–468
See application file for complete search history.

(56) References Cited

U.S. PATENT DOCUMENTS 6,535,557 B1 * 3/2003 Saito et al. ................. 375/240.1
7,209,443 B2 4/2007 Mukai et al.
(Continued)

FOREIGN PATENT DOCUMENTS

CN 1968413 A 5/2007
EP 1387585 A1 2/2004
(Continued)

OTHER PUBLICATIONS

English Bibliography for JP Pat. App. Publication No. JP 7-264197, published Oct. 13, 1995, in Japanese, printed from Thomson Innovation on Jun. 21, 2013, 3 pp.
(Continued)

*Primary Examiner* — Ricky Ngo
*Assistant Examiner* — Iqbal Zaidi
(74) *Attorney, Agent, or Firm* — Fay Sharpe, LLP (57) ABSTRACT

A method for control of congestion of traffic, being categorized according to a number of layers (L), in a network node, comprises a step of monitoring the amount (n(t)) of incoming flows to this node such that, based upon this amount (n(t)) of incoming flows and on a current number of accepted layers (l(t)), a next number of accepted layers (l(t+1)) for entry into said node is determined by consultation of an action table (T). In an enhanced embodiment the action table is adjusted based on the observed traffic during an observation period.

22 Claims, 11 Drawing Sheets

(51) Int. Cl.
*H04L 12/54* (2013.01)
*H04L 12/913* (2013.01)
*H04L 12/801* (2013.01)
*H04L 12/927* (2013.01)
*H04L 12/853* (2013.01)
*H04L 12/811* (2013.01)

(56) References Cited

U.S. PATENT DOCUMENTS

| | | | |
|---|---|---|---|
| 2001/0047423 A1 | 11/2001 | Shao et al. | |
| 2003/0067872 A1 | 4/2003 | Harrell et al. | |
| 2003/0195977 A1 | 10/2003 | Liu et al. | |
| 2004/0194142 A1 | 9/2004 | Jiang et al. | |
| 2007/0115841 A1* | 5/2007 | Taubman et al. | 370/252 |
| 2007/0165524 A1 | 7/2007 | Mascolo | |
| 2009/0196194 A1* | 8/2009 | Paloheimo et al. | 370/252 |
| 2013/0114594 A1* | 5/2013 | Van Zijst | 370/390 |

FOREIGN PATENT DOCUMENTS

| | | |
|---|---|---|
| JP | 7-264197 A | 10/1995 |
| JP | 2003-078561 A | 3/2003 |
| JP | 2005-064970 A | 3/2005 |
| JP | 2005-204157 A | 7/2005 |
| JP | 2006-060448 A | 3/2006 |
| JP | 2007-504694 A | 3/2007 |
| WO | WO 2006/048842 A1 | 5/2006 |

OTHER PUBLICATIONS

English Bibliography for JP Pat. App. Publication No. JP 2003-078561, published Mar. 14, 2003, in Japanese, printed from Thomson Innovation on Jun. 21, 2013, 4 pp.
English Bibliography for JP Pat. App. Publication No. JP 2005-064970, published Mar. 10, 2005, in Japanese, printed from Thomson Innovation on Jun. 21, 2013, 3 pp.
English Bibliography for JP Pat. App. Publication No. JP 2005-204157, published Jul. 28, 2005, in Japanese, printed from Thomson Innovation on Jun. 21, 2013, 3 pp.
English Bibliography for JP Pat. App. Publication No. JP 2006-060448, published Mar. 2, 2006, in Japanese, printed from Thomson Innovation on Jun. 21, 2013, 3 pp.
English Bibliography for JP Pat. App. Publication No. JP 2007-504694, published Mar. 1, 2007, in Japanese, printed from Thomson Innovation on Jun. 21, 2013, 3 pp.
Cohen et al., "Streaming Fine-Grained Scalable Video over Packet-Based Networks," IEEE Telecommunications Conference, vol. 1, pp. 288-292, XP001195579, Nov. 27, 2000.
International Search Report for PCT/EP2010/058120 dated Aug. 11, 2010.
English Bibliography for Chinese Patent Application Publication No. CN1968413A, published May 23, 2007, printed from Thomson Innovation on Mar. 4, 2014, 8 pages.

* cited by examiner

| highest layer l(t) | number of flows n(t) | action |
|---|---|---|
| 6 | 170 | 0 |
| 6 | 180 | - |
| 7 | 130 | + |
| 7 | 140 | 0 |
| 7 | 150 | - |
| 8 | 130 | - |
| ... | | |

Fig. 5a

| highest layer l(t) | number of flows n(t) | action |
|---|---|---|
| ... | | |
| l(t)=6 | n(t)<140 | + |
| l(t)=6 | 140≤n(t)≤170 | 0 |
| l(t)=6 | n(t)>170 | - |
| l(t)=7 | n(t)<130 | + |
| l(t)=7 | 130≤n(t)≤150 | 0 |
| l(t)=7 | n(t)>150 | - |
| l(t)=8 | n(t)<100 | + |
| l(t)=8 | 100≤n(t)≤130 | 0 |
| l(t)=8 | n(t)>130 | - |
| ... | | |

METHOD AND APPARATUS FOR CONGESTION CONTROL

The present invention relates to a method and apparatus for congestion control.

For on-demand streaming services congestion control is usually performed via Resource Admission Control. Such a system checks, either by monitoring the number of ongoing flows of which the characteristics are assumed to be known, or by monitoring the (momentary) bit rate of the aggregate of flows directly, whether or not the new flow of which the characteristics are assumed to be known, will still fit on all the links the flow will travel through. If this check gives a positive answer, the flow is accepted, otherwise the flow is rejected. This decision is enforced either at the application level, by not setting up the session, or by a policy enforcer at the edge of the network which blocks the traffic stemming from the rejected flow even if the session would have been set up. In such an architecture the user gets either the video in full quality or is denied the service.

An alternative way of congestion control is via scalable codecs. Therein each multimedia flow is encoded in layers of decreasing importance.

In contrast to the relying on Resource Admission Control, methods based on scalable codecs never deny the user access to the service, but the quality is sometimes lower than he/she aimed for.

A drawback of all these known methods is that there is no absolute guarantee that packets of higher importance are neither lost nor dropped.

To overcome the drawbacks a method according to the invention includes the steps of monitoring the amount of incoming flows to this node such that, based upon this amount of incoming flows and on a current number of accepted layers, a next number of accepted layers for entry into said node is determined by consultation of an action table.

In this way, by letting the number of accepted layers depend on the previous number, on the number of incoming flows and on an action table, a more accurate congestion control method is obtained while at the same time guaranteeing the more important packets to be preserved.

In an enhanced embodiment this action table is dynamically adjusted based on observed traffic towards said node.

This has the advantage that decisions will reflect the traffic status, allowing for a more precise determination of the allowed layers, even more improving the quality.

By dynamically adjusting the action table at regular intervals based upon traffic observed during an observation period, and whereby a Markov Decision Process is used for determining an optimum action table, even a better quality is obtained.

The action table may be centrally calculated by a network congestion controller and further communicated to said node, or can be stored locally within the node itself.

The action table can be updated locally within a node or can be centrally updated by a network congestion controller.

In case the action tables are updated within the nodes, a communication, between different nodes implementing said method, of the resulting action as determined by consultation of said action table can be performed, such that, in case conflicting actions arise, a further heuristic control for adapting the next number of accepted layers, per node, is executed within said nodes. In this way potentially conflicting situations arising between neighbouring nodes can be solved.

The present invention relates as well to a congestion control device for implementing the present method and to a network congestion controller for communicating action tables and their updates to certain embodiments of congestion control devices.

It is to be noticed that the term 'coupled', used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

The above and other objects and features of the invention will become more apparent and the invention itself will be best understood by referring to the following description of an embodiment taken in conjunction with the accompanying drawings wherein.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Figure 1:
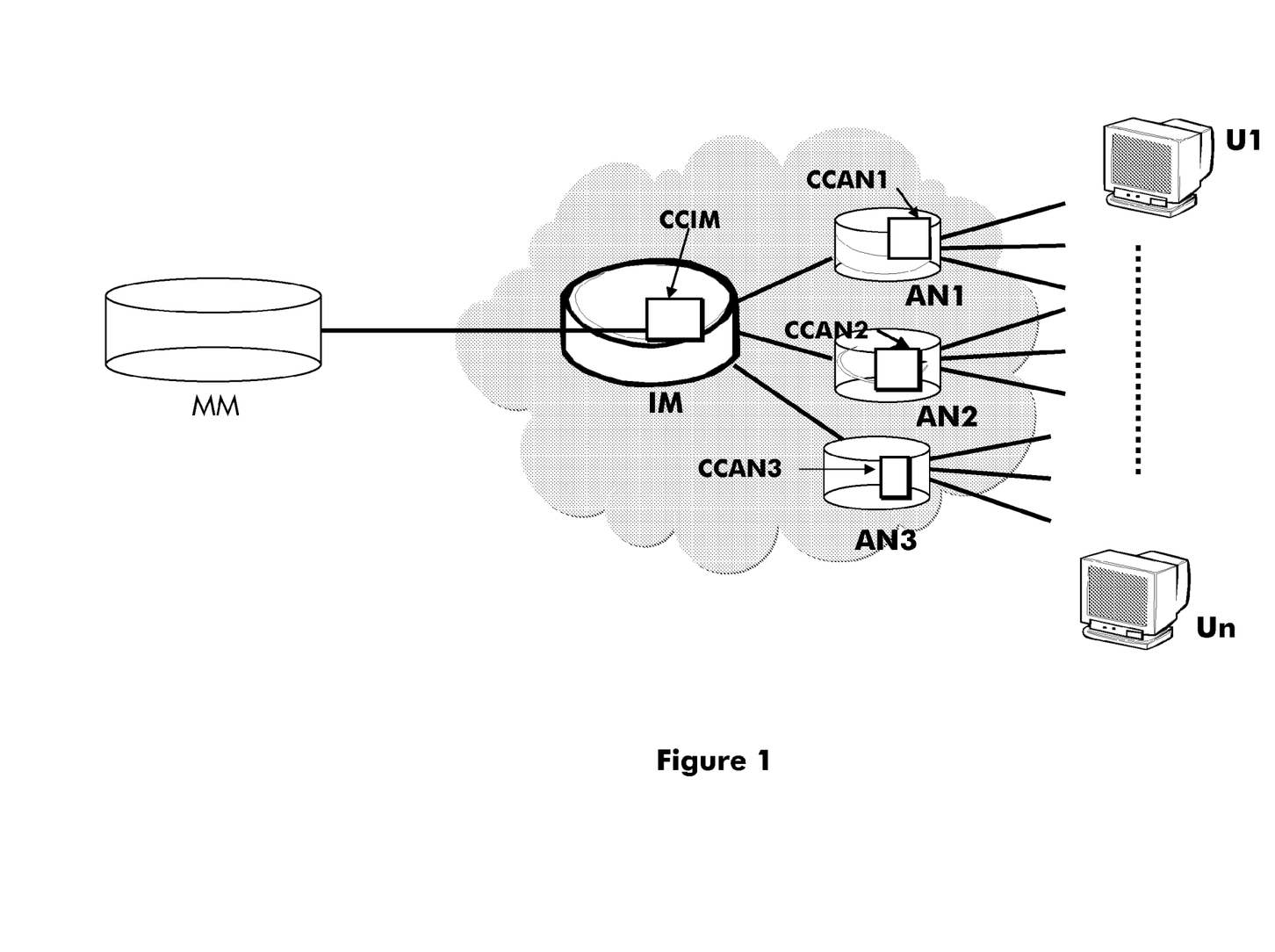
FIG. 1 shows a high-level architecture for realizing an embodiment of the method.

An embodiment of the method proposes a new type of congestion control via scalable codecs, referred to as choking-based congestion control. This method can be used in a number of networks such as the one which is schematically depicted in FIG. 1. In the following an embodiment of the invention will be explained for use in e.g. a DSL access network, but other embodiments of the invention are possible in all other types of networks, whether fixed or mobile.

In FIG. 1 a multimedia server MM is coupled via an intermediate node IM such as a service aggregator to at least one access node. In FIG. 1 only 3 of them are depicted, denoted AN1 to AN3. In real networks the number of access nodes can easily be in the range 10 to 100. In general these access nodes can each be coupled to individual users depicted U1 to Un, one access node typically serving 100 to 1000 users.

Figure 2:
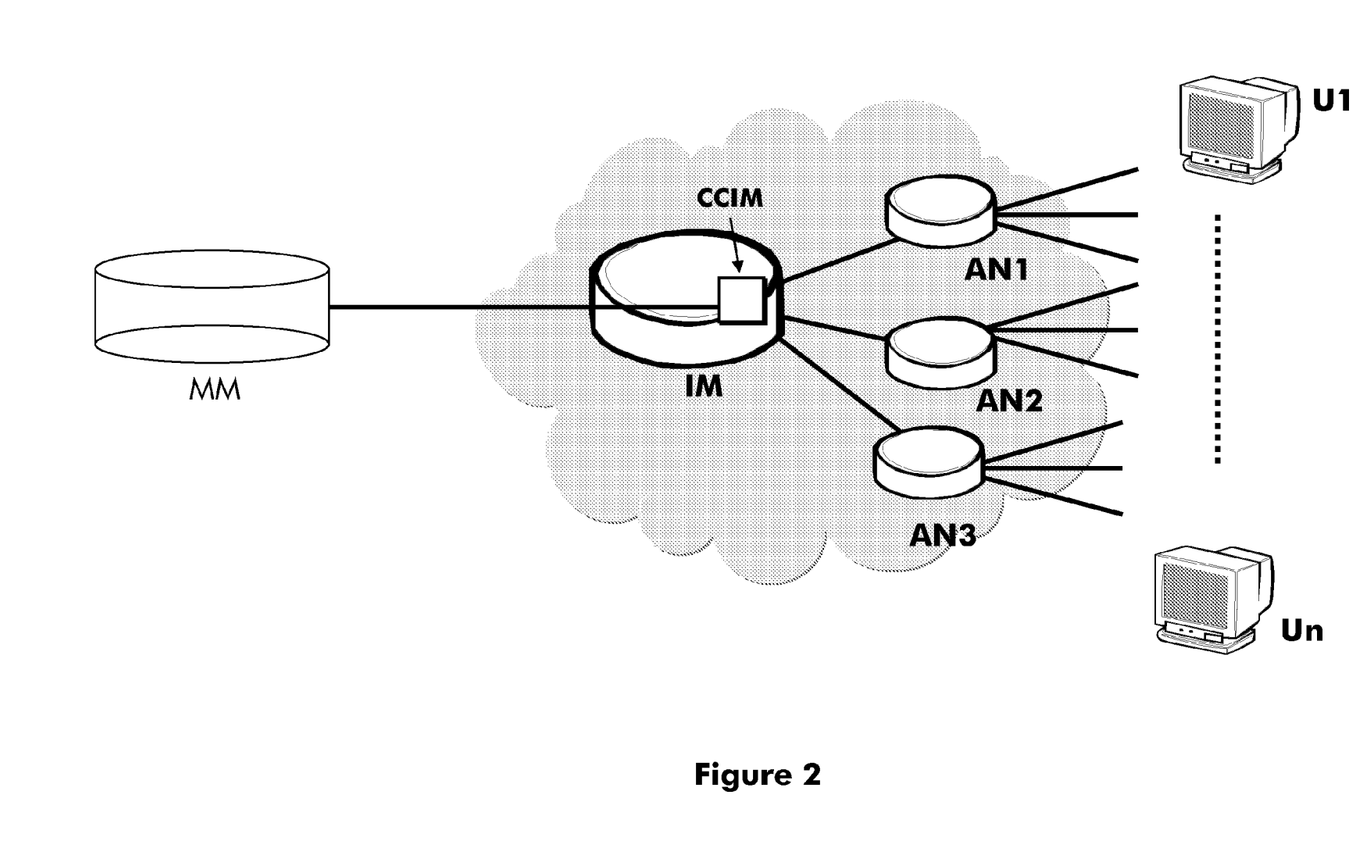
FIG. 2 shows another high-level architecture for realizing another embodiment of the method.

According to an embodiment of the invention, at least one of the nodes comprises a congestion control device. In FIG. 1 an embodiment is depicted in which all nodes are equipped with such a congestion control device, which are denoted CCAN1 to CCAN3 for the respective congestion control devices in the respective access nodes AN1 to AN3, and CCIM for the congestion control device comprised in the intermediate node IM. Other embodiments are possible in which only one node, irrespective of being an access node or intermediate node, includes such a congestion control device. Such an embodiment wherein only the intermediate node comprises a congestion control device in accordance to the invention is depicted in FIG. 2 and will be further described into more details in the following paragraphs.

Most embodiments of congestion control devices according to the invention assume that the multimedia flows are encoded in a scalable way. Scalable video coding is standardized, e.g., in annex G of ITU-T Rec. H.264 "Advanced video coding for generic audiovisual services" and implies that the encoded video flow is built up of a base layer and at least one enhancement layers. Many standard codecs, e.g. MPEG2, 4 have scalable extensions, but other proprietary schemes can be used as well. In packet-based transport the bit streams associated with each layer are packetized in such a way that, based on an identifier in the header of each packet, it is known to which layer it belongs to. An example may be the DiffServ CodePoint (DSCP) or Type of Service (ToS) byte within the IP header which can be used for this purpose, so to identify to which layer the packet belongs to. However other identifiers in other type of headers may be used as well.

Figure 3:
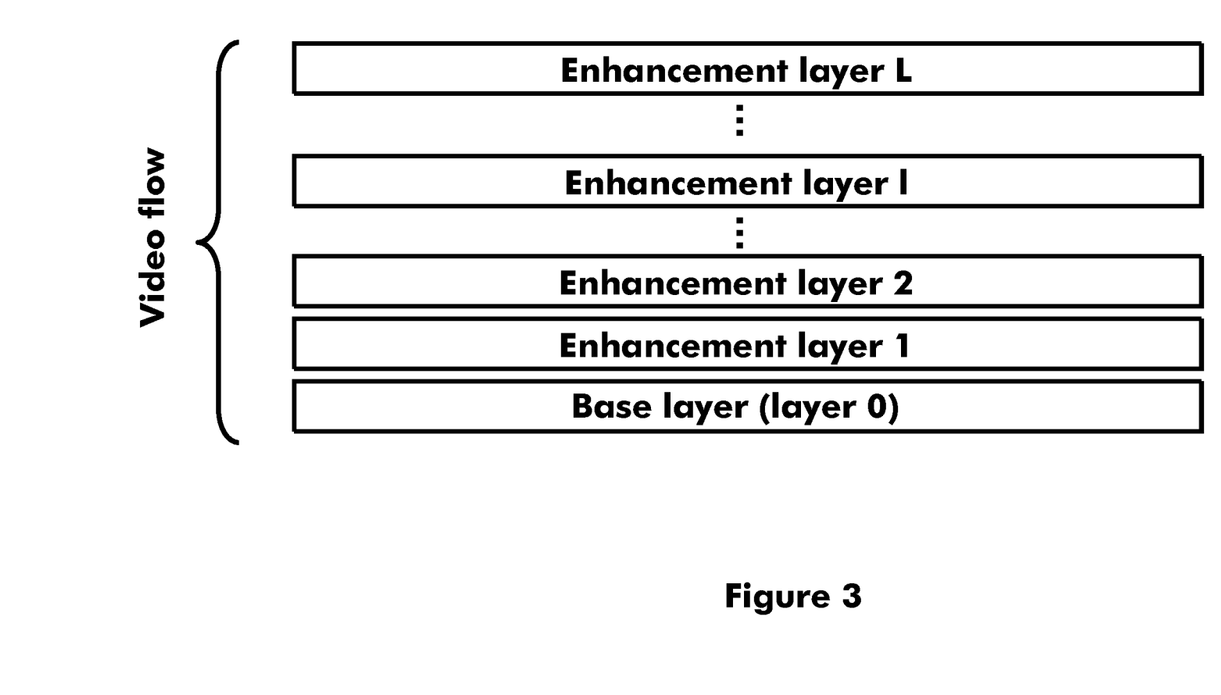
FIG. 3 shows the principle of scalable layers.

When the decoder at the user's premises only receives the base layer, the video can be decoded in basic quality. The more layers the decoder receives, the better the quality of the decoded video. As illustrated in FIG. 3 there is an ordering in the layers that determines the importance of a particular layer: layer 0 is the base layer, being the most important layer, whereas the layer with the highest number, in this case being L, is the least important one. For an arbitrary layer l there is the rule that this layer l is useless unless all layers 0 to l−1 were received.

Figure 4:
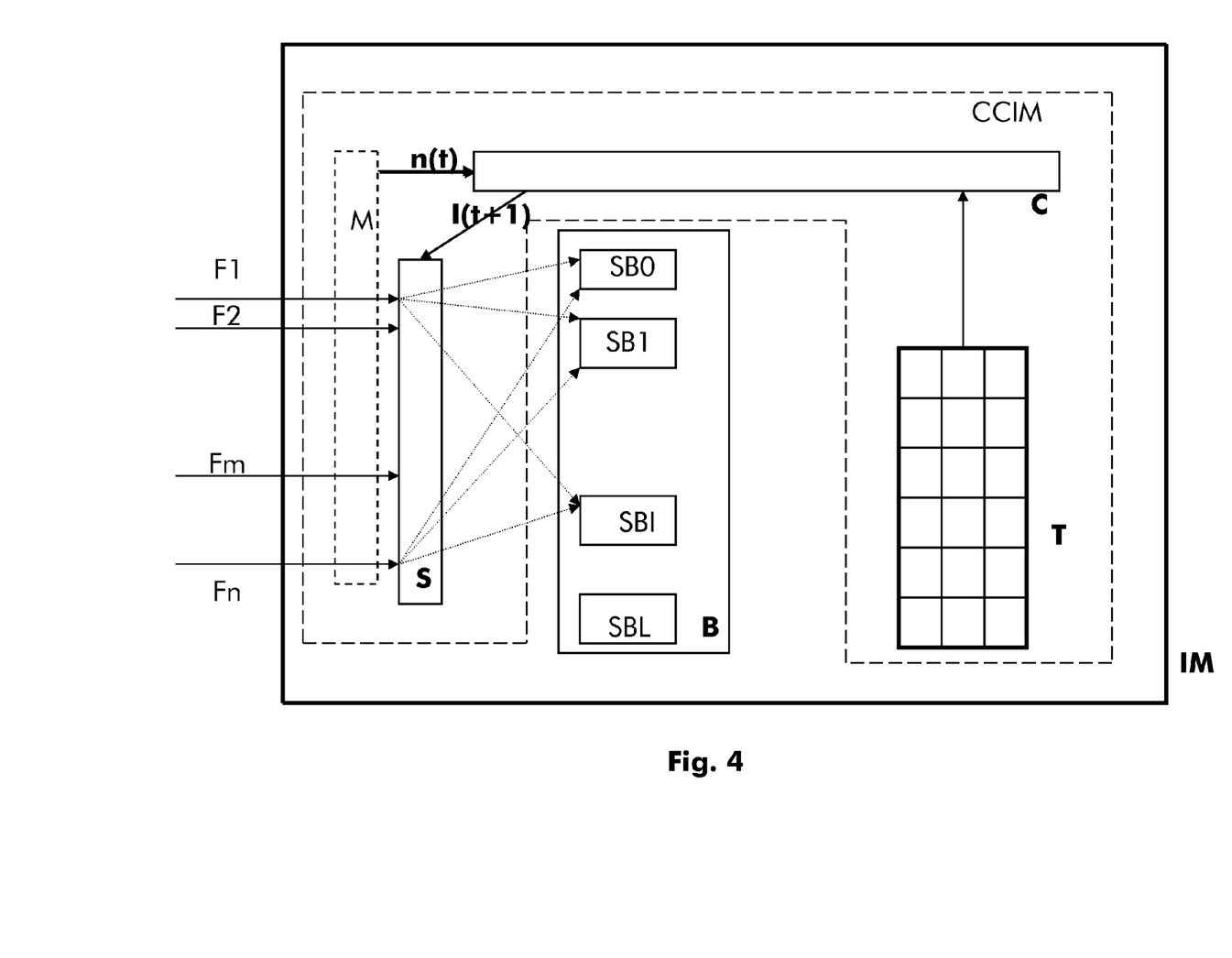
FIG. 4 shows a schematic embodiment of a congestion control device in an embodiment of a node implementation, FIGS. 5a and b show examples of a decision table to be used in some embodiments of congestion control devices.

Most embodiments of congestion control devices according to the invention also rely on a scheduling technique, performed by a scheduler in the individual node where it is part of. In FIG. 4 the node IM is depicted comprising a scheduler denoted S. This scheduler does not make a distinction between packets of different flows, but discriminates between packets associated with different layers, based on the identifier for identifying this layer. Such a scheduling technique may imply that the node comprises an input buffer, denoted B in FIG. 4, but this is not necessary. The node further comprises an embodiment of a congestion control device CCIM, which itself comprises a controller C adapted to determine and/or to adjust, at predetermined time slots, e.g. every second, up to which layer l of the L+1 layers the scheduler is adapted to allow an incoming packet to enter the node, e.g. via the buffer B. If up to and including layer 1 is allowed this means that all packets in the next time slot that have an identifier denoting a layer in the range [0,1] are accepted while the remainder of the incoming packets will be rejected. When standard SVC encoding is used, a lot of nodes already include a scheduling mechanism, but the decision to accept or reject packets is taken based e.g. on the destination of the flow. This mechanism however does not solve congestion problems. In other existing mechanisms other drawbacks relate to the fact that also layers of less importance, so with higher layer numbers, can occupy some buffer space, at the expense of buffer space for the lower layers. In addition in these other mechanisms the number of allowed layers may fluctuate rapidly over time, leading to a bad user experience. Other drawbacks are that such prior art systems may oscillate.

In accordance to the invention, an embodiment of the congestion control device will therefore include a controller which will be adapted to determine, at predetermined instances in time t, the value of l(t+1) for the next particular time instance t+1, based on the current value of l(t), based on the current number n(t) of incoming flows to the node and based upon a decision table T. This controller will thus be able to determine up to which layer l to support in the next time slot t+1. In FIG. 4 the controller C, is adapted to receive from a monitoring device M, the number n(t) of input flows F1 to Fn to the node at time instance t, and to further consult a decision table, denoted T, such as to be able to determine l(t+1). This value is provided to the scheduler S, which will accordingly filter the incoming packets, based upon their layer identifier, so that only packets up to layer l(t+1) will be allowed to pass through and be buffered at time instance t+1.

Figure 5A:
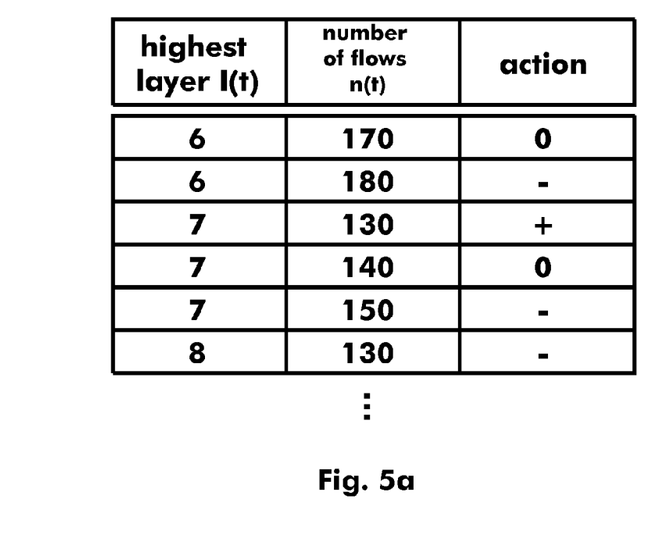
Figure 5B:
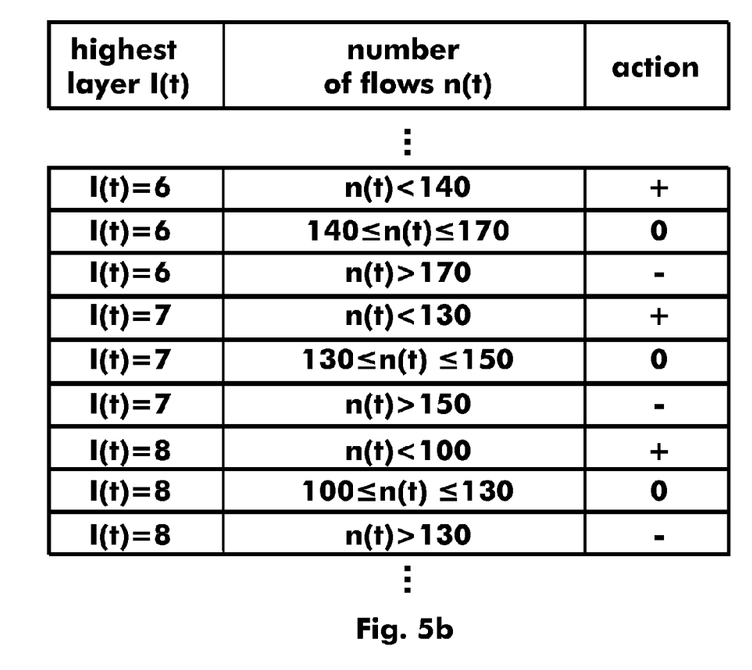

This decision table is denoted T in FIG. 4. Examples of such a decision table are shown in FIGS. 5a and 5b. The decision table in FIG. 5a has as entry variables the highest layer number l(t), and the total number n(t) of incoming flows to that node. Its last column shows an associated action, as a function of these entries, this action being denoted by either "0", "−" or "+". An action denoted by "0" means that in the next slot t+1 the same number of layers (from 0 up to and including l) will be allowed to enter the buffer. An action denoted "−" means that in the next slot t+1, one layer less will be allowed to enter the buffer resulting in that all packets with layer identifiers between and including 0 and l−1 will be allowed. An action denoted "+" means that in the next slot t+1, e.g. one layer more is allowed to enter the buffer resulting in that all packets with layer identifiers between and including layer 0 to layer l+1 are allowed. So when reading the first row on table 5a, this means that, if in the current slot 6 layers are allowed to enter the buffer, while 170 input flows are entering the node in this slot, nothing has to change as far as the number of layers allowed to enter the buffer in the next slot is concerned, so this number remaining 6. The second row on this table shows that if in the current slot 6 layers are allowed to enter the buffer while 180 input flows are entering the node in this slot, the number of layers that may enter the buffer for storage in the next slot has to be lowered e.g. by 1 with respect to the current value, corresponding to 5 layers being allowed in the next slot. The third row on this table shows that if presently 7 layers are allowed to enter the buffer and the node currently receives 130 input flows, during the next time instance 8 layers will be allowed to enter the buffer.

Instead of increasing or decreasing by 1, these actions "+" or "−" can also mean that in other embodiments e.g. 2 or 3 layers less or more are allowed.

Another example of a table is shown in FIG. 5b. Instead of absolute number of incoming flows, the number n(t) of flows are grouped in bins. The first three rows in this table indicate that if in the current slot l(t)=6 layers are allowed to enter the buffer, 1) no action is taken, keeping the number of allowed layers in the next slot to 6, e.g. l(t+1)=6) if the number of flows is between 140 and 170 boundaries included; (in accordance with the second displayed row of the table)

2) the action is to decrease the number of accepted layers, e.g. from 6 to 5, in the next slot if there are more than 170 flows; (in accordance with the third displayed row on the table), and 3) the action is to increase the number of accepted layers, e.g. from 6 to 7, if there are less than 140 flows (in accordance with the first displayed row on the table).

Similar considerations as to the previous table 5a can be made: so a "+" action can represent an increase with a predetermined number, which may be larger or equal to 1, while a "−" action represents a decrease with another predetermined number larger or equal than 1, which may be the same to the predetermined number for increasing, but which can also differ from that.

A table of the type of FIG. 5a, where all possible states are enumerated, will thus contain a high number of rows, representing all possible combinations of layer numbers and flow numbers. More specifically, if the number n(t) of flows that the node currently supports is not binned, the number of rows is equal to the maximum number of layers times the maximum number of flows, e.g., 10×1000=10000. The binning allows the tables to be much shorter, e.g., 3 entries per layer are needed for the example depicted in table 5b.

In a simple embodiment such a decision table may be stored locally in the node or in the congestion control device itself. FIG. 4 shows an embodiment where this table is stored within the congestion control device CCIM. The figure further schematically shows the principle that packets from all flows, but with identifiers up to layer l, will thus be allowed to pass into the buffer. The buffer itself does not need to be split up into several sub-buffers pertaining to the different layers, as is suggested by this figure; this is only drawn in order to better illustrate the principles that packets from all flows can pass through, but being filtered based upon their layer number.

Figure 6:
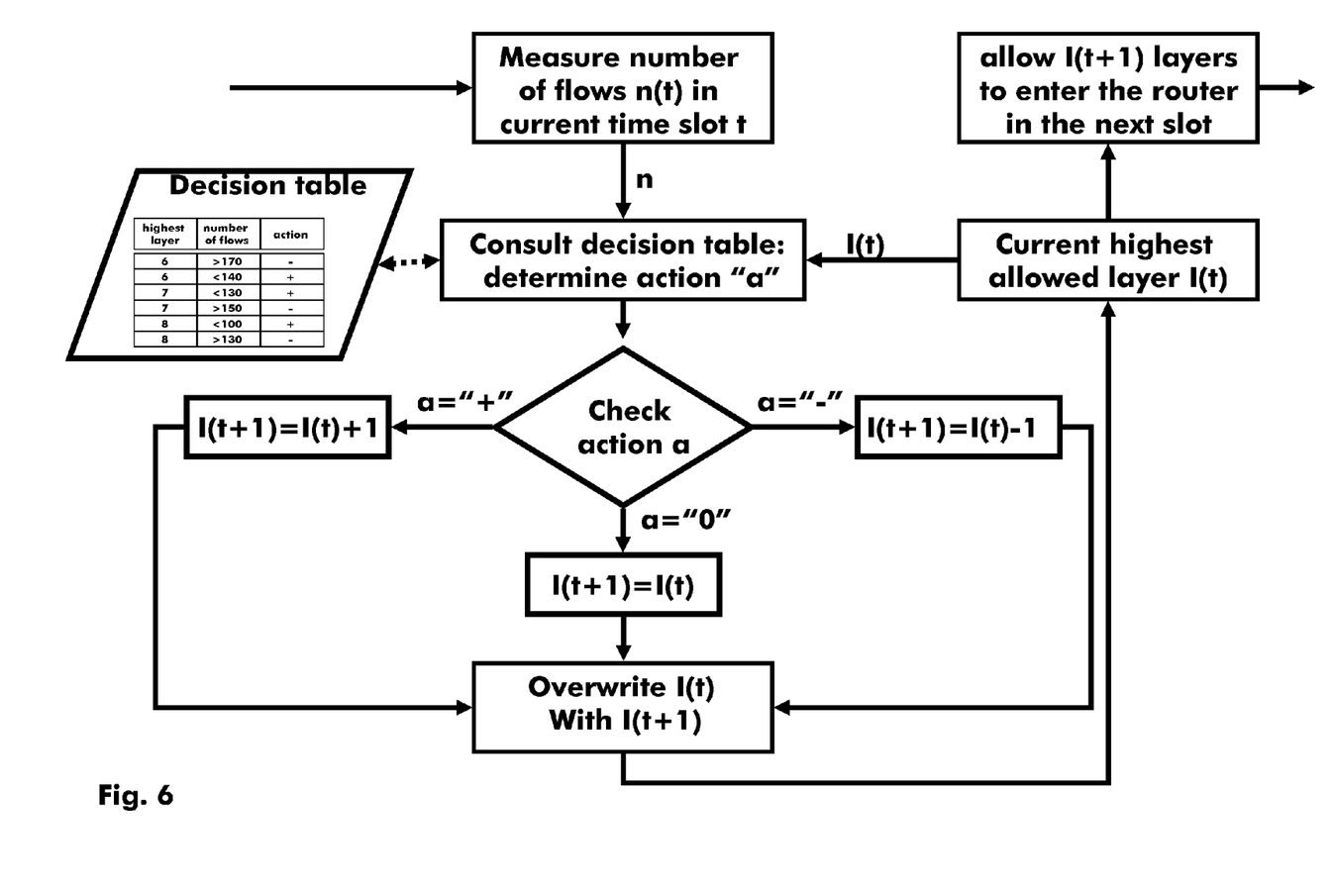
FIG. 6 shows a first flowchart for implementing an embodiment of the method.

A flowchart illustrating a detailed embodiment for implementing the different steps of the described method is shown in FIG. 6. The method starts with monitoring the number of incoming flows F1 to Fn in the current time slot. This may be performed by a monitoring device M, as shown in FIG. 4. In a next step this number of incoming flows, as well as the current highest allowed layer l(t), are used to determine the appropriate entry in the table, upon which step the resulting action can be read from the table too. These steps can be performed within the controller C. Depending on the resulting "action" value, the value of l(t+1) is adapted, and this value is fed back to the scheduler S, which is adapted to determine from all incoming packets to which layer they belong, and to accordingly pass them through to the buffer in case the layer number is lower or equal to l(t+1), or discard them, in case the layer number is larger than l(t+1). The layer identification of a packet can be found in e.g. the IP header in case this protocol is used for transport. Methods to sort packets based on an identifier in their header are well known to a person skilled in the art and will not be further explained into detail.

In more complex embodiments, the congestion control device is adapted to regularly update this table, e.g. every 20 minutes for the previous example where the time instances for determining l(t) and l(t+1) were of the order of magnitude of seconds. This update can be based on the observed traffic, during an observation period, towards the network node, but this is not necessary. In order to update this table the congestion control device CCIM is adapted to model the traffic over a certain period of time, referred to as the observation period, which is thus much longer than the time slots for updating the layer acceptance number. More precisely, it determines some parameters of an a priori chosen traffic model. Such a model can be a Markov model, but it can also be another type as will be explained in the next paragraph.

In order to update the decision table, used for determining l(t+1), a method may for instance consist of the following procedure: besides the presently active decision action table a number of preselected or predetermined alternative decision tables are maintained. These could for instance be obtained by setting the thresholds in binned tables of the type of FIG. 5b to representative sets of values, which may itself be selected based on the principles that only two thresholds are needed per level l in order to completely specify the table, and that tables where the thresholds associated with layer l+1 are higher than the ones associated with layer l, are not logical. So keeping these rules in mind, a set of representative tables can be easily chosen and these will initially be stored within IM or the congestion controller. For each of these alternative decision tables it is then calculated over the observation period what a value function would yield if this alternative action table would be used. Such a value function is for instance given by the following formula (1):

$$V[l(t),n(t)] = R[l(t),n(t),a(l(t),n(t))] + V[l(t+1),n(t+1)] \qquad (1)$$

With V[l(t),n(t)] (and V[l(t+1),n(t+1)]) representing the value function when there are l layers accepted and n input flows at time t (and the future value function at time t+1 respectively)

R[l(t),n(t),a(l(t),n(t))] representing an instantaneous reward function a(l(t),n(t)) represents the action taken when there are l layers allowed and n input flows at time t, as given in the decision table An example of an instantaneous reward function is given by the following formula (2):

$$R[l(t),n(t),a(l(t),n(t))] = \alpha \cdot G(l(t)) \cdot n(t) - \beta \cdot n(t) \cdot \max\{(F-C)/F, 0\} - \gamma \cdot n(t) \cdot 1_{\{a(l(t),n(t)) \neq 0\}} \qquad (2)$$

where $\alpha$, $\beta$ and $\gamma$ are positive constants with the following interpretations; $\alpha$ being the reward per time unit the operator gets per flow supported, $\beta$ being the penalty the operator has to pay per lost packet and $\gamma$ being the penalty the operator has to pay per quality change.

$\alpha \cdot G(l(t))$ is the reward associated with transporting the flows up to layer l in slot t, e.g., the price a single user is willing to pay to receive a video and the quality corresponding to layer l.

F is the traffic volume in slot t. For n(t) flows F corresponds to n(t)·l(t)

and

C is the link capacity, i.e., the amount of information that can be transmitted per slot t. Alternatively C can be chosen slightly smaller than the link capacity to better avoid overflow.

After the observation period the alternative decision table that has accumulated the highest value is promoted to the active decision table if it exceeds the value associated with the active decision table. In that case the active decision table is demoted to be one of the alternative decision tables. For this method to be efficient a lot of alternative action tables need to be evaluated. An alternative method that avoids this is described next.

For this alternative method first a transition matrix has to be created, which is based on the observation of the traffic. Such a transition matrix can contain entries representing the likelihood that the number of flows are increased/decreased from a certain value, indexed by the row of the matrix for this entry, to another value, indexed by the column of the matrix for this entry. In this case the transition matrix TRM [n(t),n(t+1)] is thus built based on the observed difference between the absolute number of flows in a current time slot t and the next time slot t+1. With this transition matrix as input, the decision table to be used for determining the l(t) can be updated based on e.g. Markov Decision Process theory, hereafter abbreviated by MDP theory, optimizing the average of a value function under the assumption that only three possible actions can be taken as these mentioned in a previous paragraph:

1) allow one or more layer extra in the next slot, as represented by action "+", 2) allow the same amount of layers in the next slot, as represented by action "0" or 3) allow one or more layers less in the next time slot, as represented by action "−", as corresponding to the actions as related to the previously described decision table.

MDP theory allows to select the optimum action table for a Markov process described by such a transition matrix TRM [n(t),n(t+1)] and a given value function. A value function V(l(t),n(t)) may consist of the sum of an instantaneous reward and an expected future value, which itself depends on the transition matrix and the actions taken, as expressed by the following formula (3):

$$V[l(t),n(t)] = R[l(t),n(t),a(l(t),n(t))] + \Sigma_j TRM[n(t),j] \cdot V[l(t+1),j] \quad (3)$$

With $V[l(t),n(t)]$ representing the value function when there are l layers accepted and n input flows at time t $R[l(t),n(t),a(l(t),n(t))]$ representing an instantaneous reward function $a(l(t),n(t))$ represents the action taken when there are l layers allowed and n input flows at time t, as given in the decision table and $\Sigma_j TRM[n(t),j] \cdot V[l(t+1),j]$ representing the average future value associated with moving from state (l(t),n(t)) to (l(t+1),n(t+1)), where l(t+1) is the number of allowed layers in the next time slot determined by the action a(l(t),n(t)) and the current number of allowed layers l(t).

As a matter of fact, $l(t+1) = l(t) + 1_{\{a(l,n)="+"\}} - 1_{\{a(l,n)="-"\}}$, where $1_A$ is the indicator function that takes the value 1 is the statement A is true and 0 otherwise.

An example of an instantaneous reward function R[l(t),n(t),a(l(t),n(t))] can be given by the already given formula (2). Another example of such a reward function can be given by the following formula (4):

$$R[l(t),n(t),a(l(t),n(t))] = \alpha \cdot G(l(t)) - \beta \cdot \max\{(F-C)/F, 0\} - \gamma \cdot 1_{\{a(l(t),n(t))\neq 0\}} \quad (4)$$

where

α, β and γ are positive constants

α·G(l(t)) is the reward associated with transporting the flows up to layer l in slot t, e.g., the price users are willing to pay to receive a video and the quality corresponding to layer l.

F is the traffic volume in slot t. For n flows F corresponds to n·l and

C is the link capacity.

Within both expressions (2) and (4) max {(F−C)/F,0} is approximately equal to the packet loss during slot t, such that this second term is equal to the discount for lost packets. The last term is the discount associated with fluctuations (where $1_{\{a(l,n)\neq 0\}}$ is an indicator function which takes the value 1 if α(l,n)="0" and 0 otherwise) which discourages changing the maximum supported layer l too often from slot to slot.

Figure 7:
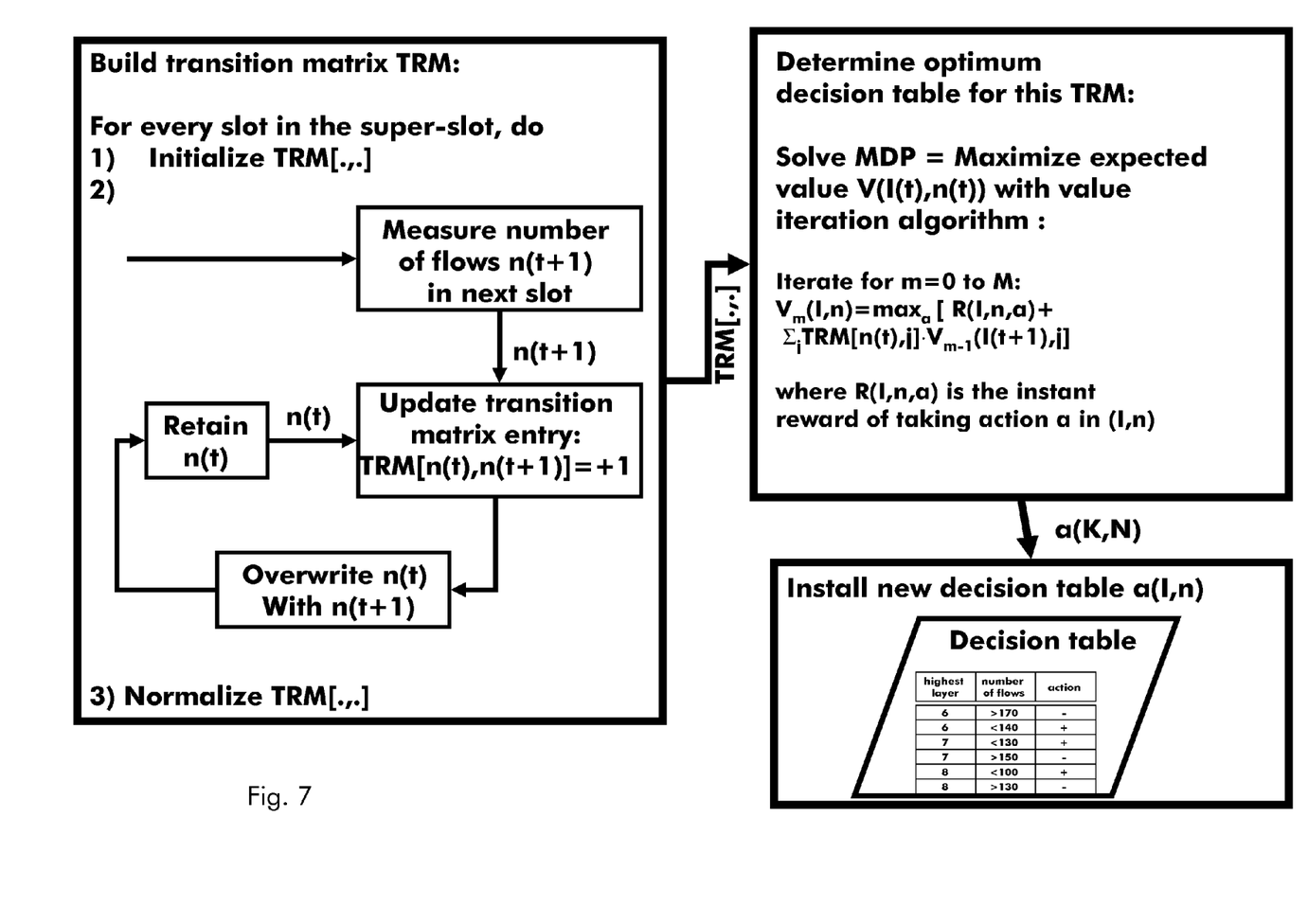
FIG. 7 shows a flowchart for implementing the steps of an enhanced method.

This process is schematically illustrated in FIG. 7. In this embodiment a first block shows how the transition matrix TRM is gradually built up, by measuring the number of flows n(t+1) within the next time slot and by comparing this with the previously measured number of flows n(t). More precisely, at the beginning all entries of TRM are put to 0. For each of the time slots t, the entry of the TRM matrix on the row with number n(t) and in column with number n(t+1) is increased by 1, in case the measured number of flows is indeed found to change from n(t) to n(t+1). Consequently after the total observation period, each entry in the TRM matrix in general contains how many times n(t) input flows, with n(t) being a variable indexing the rows, in the current slot t, were changed into n(t+1), with n(t+1) representing another variable number indexing the columns, in the next slot.

Finally, the transition matrix is normalized such that all entries of a row are multiplied by the same number resulting in that the sum of the entries of each row is equal to 1. This enables the optimum decision table T to be obtained via, e.g., the iteration of the value function using an algorithm of the MDP theory.

This optimum decision table is the decision table that maximizes equations (1) given (2), as is explained in FIG. 7. Once this optimum table is found on the basis of this MDP theory, this optimum table will then be installed to be used during the next cycle, as is also shown in FIG. 7.

This process of building the transition matrix and determining the optimum decision table may be done every observation period T, with in a preferred embodiment T>>time slot t. Remark that the period over which the traffic is observed does not need to be equal to T, but can be longer, e.g., 2 T, and can be adapted during the course of the process. In that respect the observation period and the table adaptation period can be different, and each be adjustable during the course of the process.

Based on this learned model an embodiment of such an enhanced controller is adapted to calculate the optimal decision table, for instance using Markov Decision Process (MDP) theory, for each node individually. Remark that, although the optimal decision tables only rely on the current amount of input flows n(t), the actions taken do take the likely future evolution of the traffic into account. For example the MDP theory allows anticipating the most likely future evolution if the observation period is chosen long enough for all possible events to have occurred and short enough with respect to known diurnal evolutions.

Figure 8:
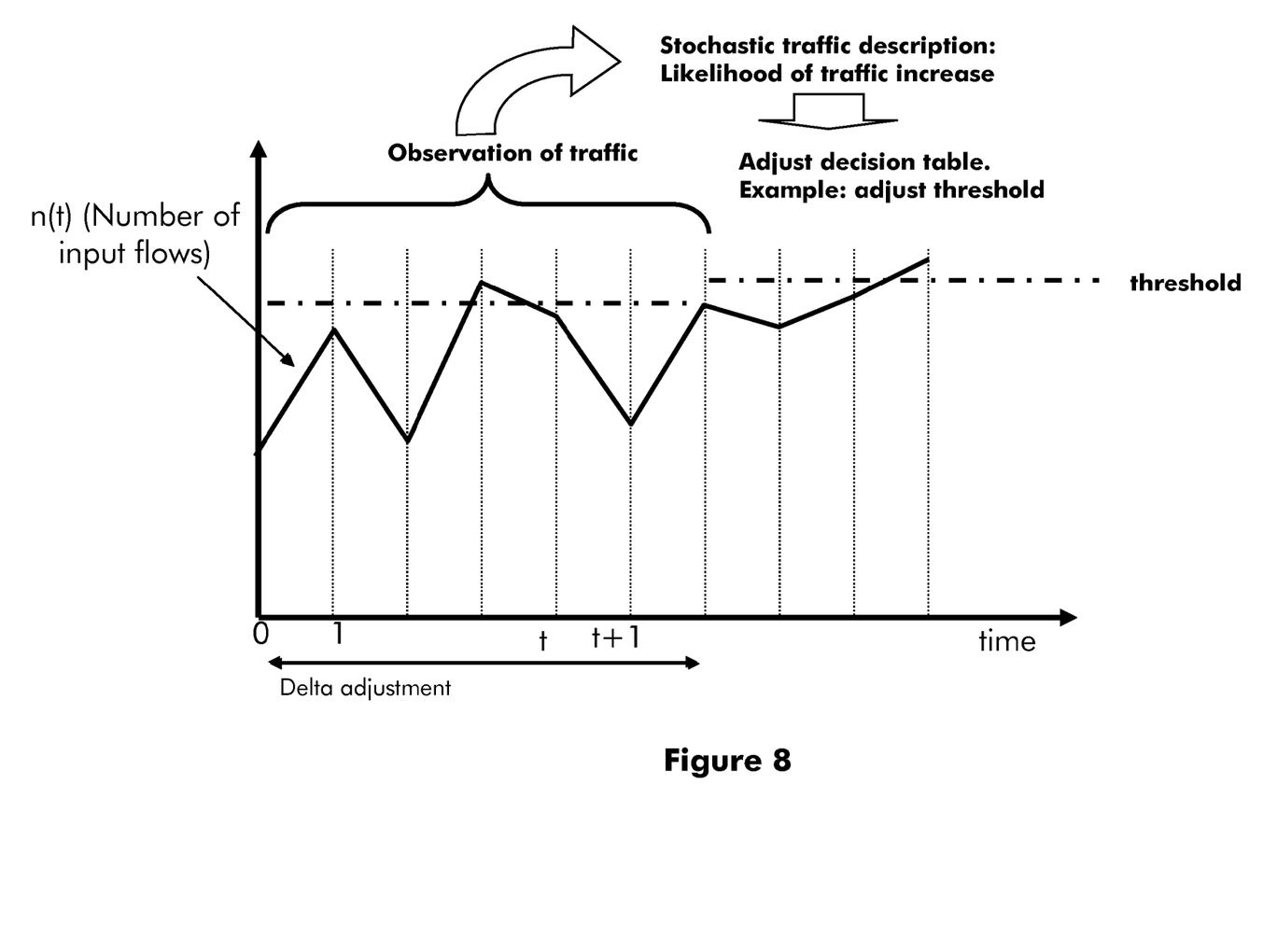
FIG. 8 shows a timing diagram showing the effect of such an enhanced embodiment of the method.

The effect of this learning process is illustrated in FIG. 8. This figure shows the evolution of the amount of incoming flows n, as a function of time t. This evolution is depicted by the thick black line. At time instance 0, this number is rather low, the next time instance (1), this number has increased etc. This figure also shows a threshold of a (binned) decision table of the type depicted in FIG. 5(b) for one particular value of l. For this particular value of l, which was thus the highest layer that is allowed to enter the buffer in the current slot t, there are two associated thresholds in accordance with the table 5b. If n(t) lies below the lowest threshold the action was "+", according to this table, f n(t) lies between the two thresholds the action is "0" and if n(t) exceeds the highest threshold that action was "−". Only the highest threshold for one particular l is shown on the figure. The figure illustrates that after observing the traffic over the table adjustment period, denoted "delta adjustment", the new decision table is calculated and loaded. Referring to a decision table of the type of FIG. 5b, this boils down to adjusting the values of the thresholds, which is illustrated in FIG. 8 by an increase of the value of the high threshold. As it hardly occurred that the total amount of traffic was exceeding this threshold, the result of the MDP algorithm was thus that, based on this observation, it is safe to increase this threshold.

Figure 9:
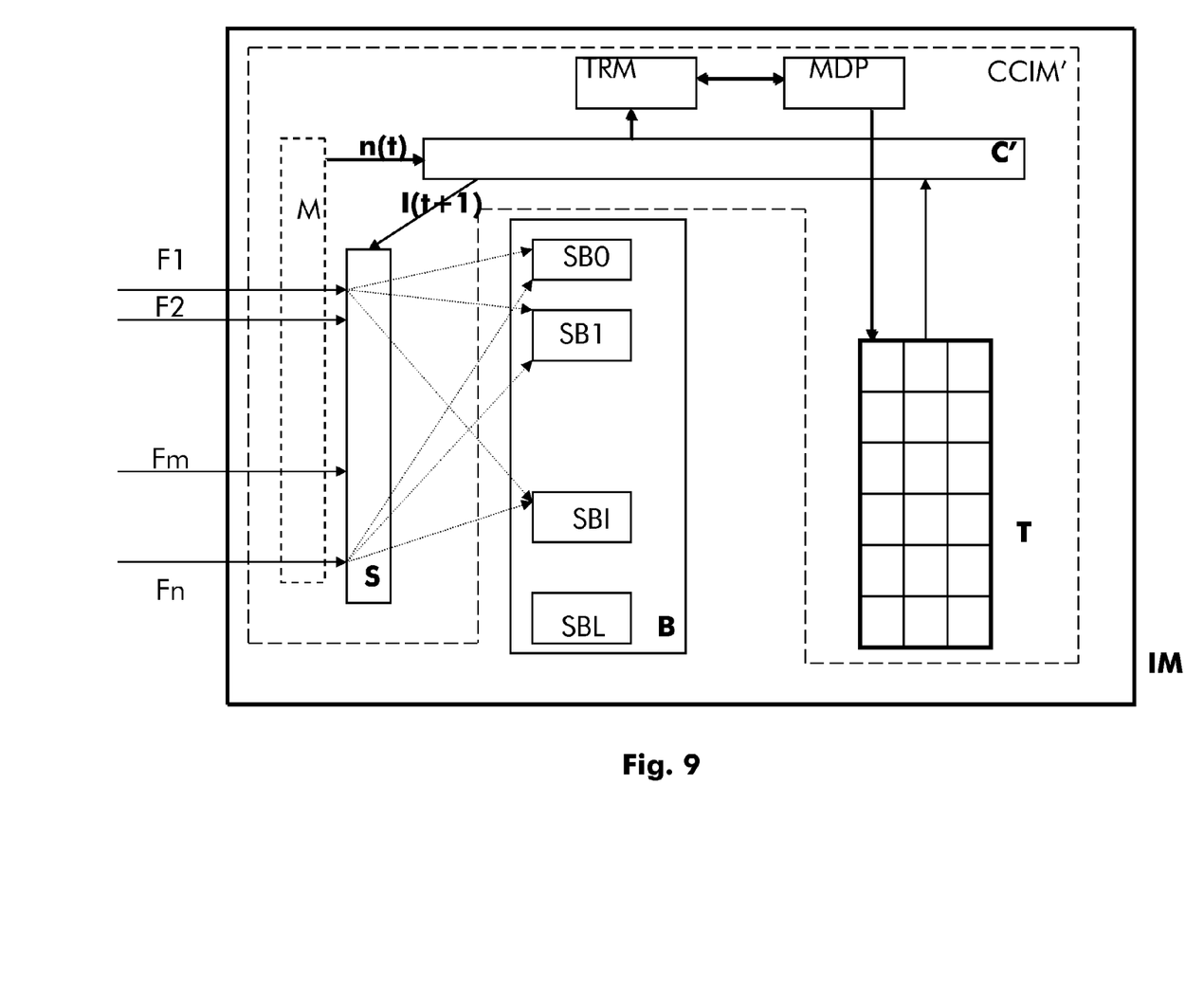
FIG. 9 shows a schematic embodiment of an enhanced version of a congestion control device.

A more detailed implementation for such a more complex congestion control device CCIM' comprised in one node is shown in FIG. 9. With respect to FIG. 4 this intermediate node, in this embodiment, comprises extra processing or other devices, one being denoted TRM, for building up the transition matrix, and another device denoted MDP for determining the decision table that yields the best reward according to the reward function given by equations (1) and (2), leading to an update of the decision table T. Of course all the method steps can be executed within the controller C' too, or on one processing device.

In this respect it is to be mentioned that the functions of the various elements shown in the figures, including any functional blocks labeled as "controllers", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Apart from the previously described embodiments, other embodiments are possible where, in order to avoid potential contradicting decisions between neighbouring nodes, which can each implement the explained method, a coordination strategy is used. In a tree-based network architecture with local decision tables the simplest example for such a coordination strategy can be based on aggressive decreasing and careful increasing. More specifically, referring back to the network of FIG. 1 this can involve enforcing following policy:

1) enforce every "−" action from the ANs and ignore the "+" action from the IM e.g. turn a "+" action in a "0" in the IM, if at least one AN has the action "−";

2) if only the IM has the "−" action and all the AN have either "+" or "0" actions, enforce a "−" action on the AN that supports the highest number of flows;

3) If no AN asks for a "−" action and only one AN asks for a "+" action, allow this only if the IM did not ask for a "−" action;

4) If no AN asks for a "−" action and more than one AN ask for a "+" action, allow only one AN the "+" action, e.g., the one with the minimum l and maximal n, provide the IM did not ask for a "−" action.

Figure 10:
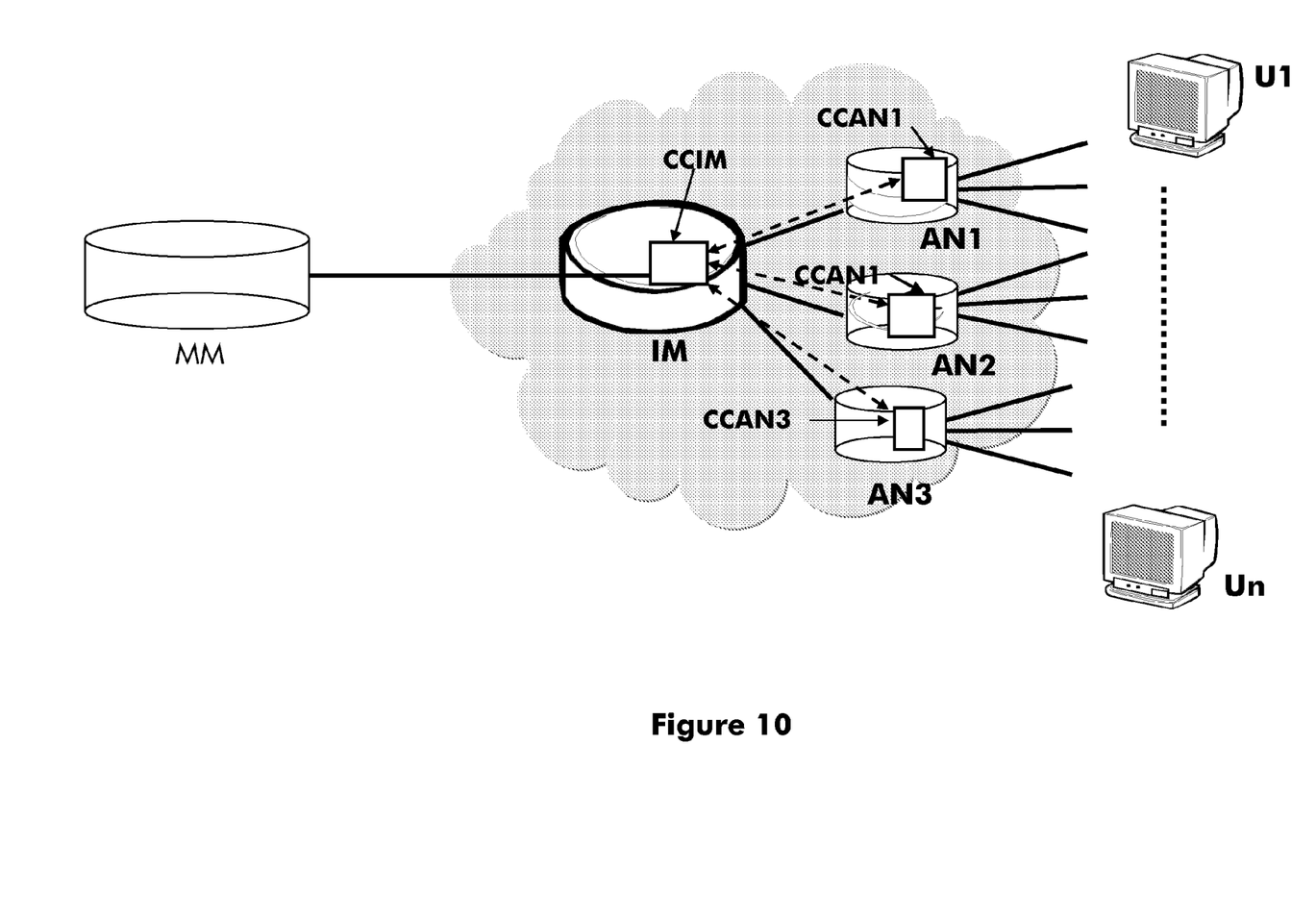
FIG. 10 shows another high-level architecture for realizing a variant embodiment of the method and FIG. 11 shows another high-level architecture for realizing another embodiment of the method.

The extension to multiple nodes can thus involve a local decision table per node, associating with each local state $l_k(t), n_k(t)$ with k representing the index per node, the appropriate action in node k, plus a coordination or tie-breaker strategy. This involves some communication in between the different congestion control devices between the nodes, which is depicted by means of the dashed arrows between the individual congestion control devices in FIG. 10. Alternatively also a global coordination strategy can be implemented. In this case the decision tables per node depend not only on local information, but on global information: and a global, centrally implemented action table will comprise actions associated with each possible combination of $(l_1(t), n_1(t), \ldots, l_k(t), n_k(t), \ldots l_K(t), n_K(t))$. In this case information needs to be exchanged between the central or global network controller wherein this global action table will be stored, and the individual nodes, so that they each can have their own, different action table for each node. All information of $(l_1(t), n_1(t), \ldots, l_k(t), n_k(t), \ldots l_K(t), n_K(t))$ that is non-local is then to be communicated from the global network controller to the individual nodes.

Apart from this exchange of information another function of this global network congestion controller can be to determine the table updates. For that purpose it observes how the number $n_k(t)$ of flows evolves over time for each node k (= 1 . . . K). This can be done via its knowledge of the network topology and exchange of information with the application provider. It is then adapted to build either a transition matrix for each node individually (to capture how $n_k$ evolves at node k) or a global transition matrix for the network (to capture how $(n_1(t), \ldots, n_k(t), \ldots, n_K(t))$ evolves), resulting from observations over an observation period T. It is further adapted to solve the MDP for this transition matrix for each node individually (with the same localized reward function and the same set of possible actions) or globally where the total reward is a weighted sum of the local rewards. A decision table per node results, which is then further communicated to the local nodes.

Even in the previous case, where the nodes individually determine and adapt their action table and in case a tie breaker procedure is needed a network congestion controller can calculate the possibly tie-broken actions itself and communicate them to the individual nodes or the network congestion controller can relay the decisions of the local nodes to each other such that they can consequently take further decisions on their own, provided that they have access to their own congestion state and provided that they know when a coordination action is needed.

Figure 11:
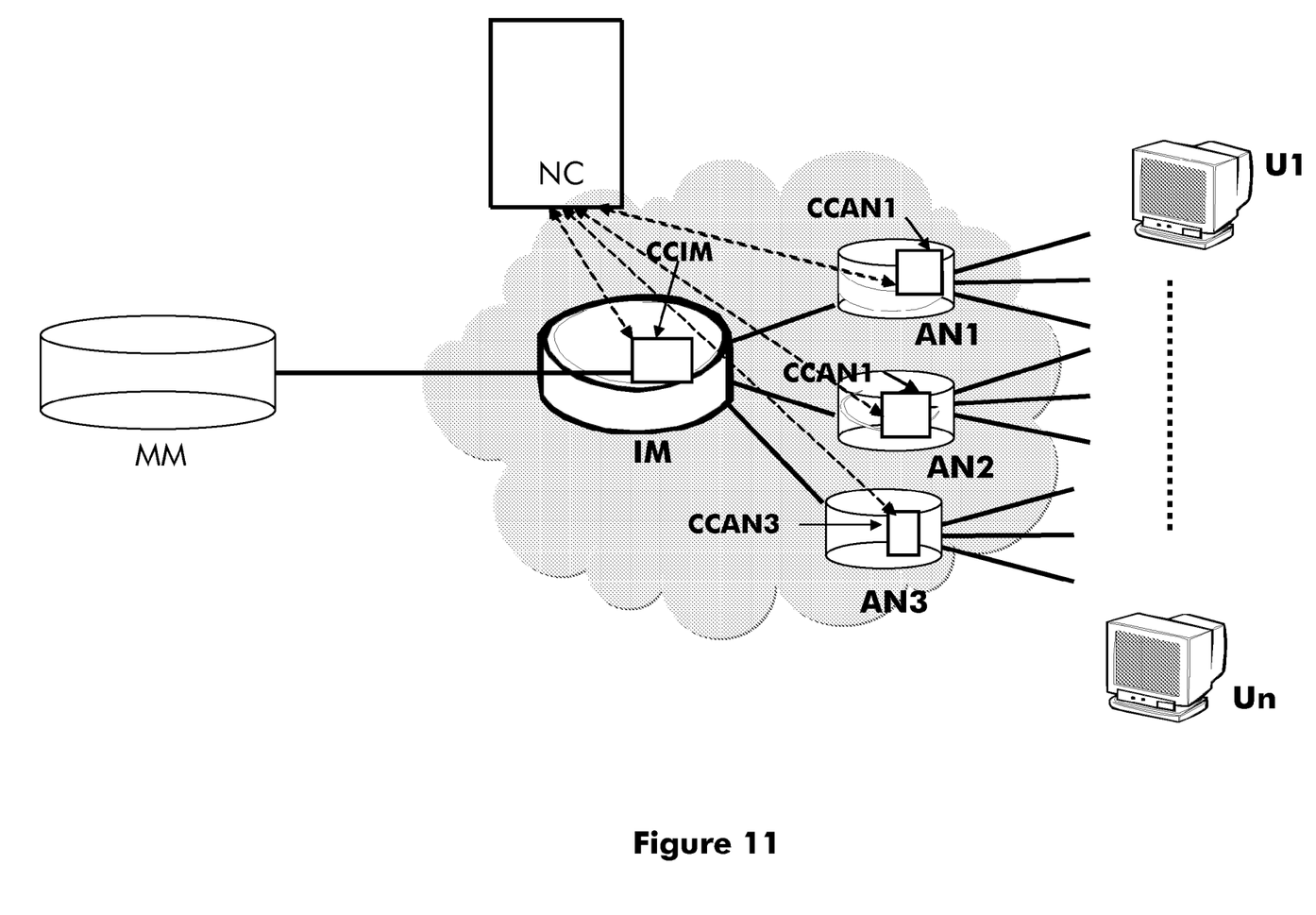

Such an embodiment with a central or global network congestion controller NC is depicted in FIG. 11. It is thus adapted to communicate with all individual congestion control devices within the different nodes.

In another embodiment the traffic can be observed via the bit rate on the links instead of measuring the number of flows.

While the principles of the invention have been described above in connection with specific apparatus, it is to be clearly understood that this description is made only by way of example and not as a limitation on the scope of the invention, as defined in the appended claims.

The invention claimed is:

1. A method for congestion control at a network node in a network, said method comprising:
   - monitoring incoming flows to a network node at a congestion control device to identify a flow quantity, each incoming flow including multiple layers representative of a basic quality layer and one or more quality enhancement layer, the multiple layers including layer identifiers indicating an order of importance of the corresponding layer for the corresponding incoming flow;
   - consulting an action table to identify a control action based on the flow quantity;
   - determining a next accepted layers quantity at the congestion control device based on the identified control action and a current accepted layers quantity;
   - identifying specific layers in each incoming flow that relate to the next accepted layers quantity based on the layer identifiers; and
   - allowing packets from the specific layers related to the next accepted layers quantity of the incoming flows to enter said network node during a next time period.

2. The method according to claim 1 wherein said action table is dynamically adjusted based on observed traffic towards said network node.

3. The method according to claim 1 wherein said action table is dynamically adjusted at regular intervals based upon traffic observed during an observation period.

4. The method according to claim 3 wherein a Markov Decision Process is used to determine an optimum action table based on the traffic observed during the observation period.

5. The method according to claim 1 wherein the action table is locally stored within said network node.

6. The method according to claim 1 wherein said action table is calculated by a central network congestion controller with access to the network node via the network and communicated from the central network congestion controller to said network node.

7. The method according to claim 1, further comprising:
   - communicating, between different network nodes implementing said method, the control action as identified by consultation of said action table, whereby, in case conflicting control actions arise, a further heuristic control for adapting the next accepted layers quantity, per network node, is executed within said network node.

8. The method according to claim 1 wherein said action table is updated by a central network congestion controller.

9. The method according to claim 1 wherein the identified control action includes an increase action, a decrease action, or a "no change" action.

10. An apparatus for congestion control at a network node in a network, the apparatus comprising:
    - a congestion control device configured to control congestion of traffic entering a network node;
    - wherein the traffic includes multiple incoming flows to the network node, each incoming flow including multiple layers representative of a basic quality layer and one or more quality enhancement layer, the multiple layers including layer identifiers indicating an order of importance of the layers for the corresponding incoming flow;
    - wherein said congestion control device is configured to monitor the incoming flows to the network node to determine a flow quantity, configured to consult an action table to identify a control action based on the flow quantity, and configured to determine a next accepted layers quantity based on the identified control action and a current accepted layers quantity;
    - wherein the congestion control device is configured to identify specific layers in each incoming flow that relate to the next accepted layers quantity based on the layer identifiers and configured to allow packets from the specific layers of the incoming flows related to said next accepted layers quantity to enter said network node during a next time period.

11. The apparatus according to claim 10 wherein the congestion control device is configured to dynamically adjust said action table based on observed traffic towards said network node.

12. The apparatus according to claim 10 wherein the congestion control device is configured to dynamically adjust said action table at regular intervals based upon traffic observed during an observation period.

13. The apparatus according to claim 12 wherein the congestion control device is configured to use a Markov Decision to determine an optimum action table based on the traffic observed during the observation period.

14. The apparatus according to claim 10 wherein the congestion control device is configured to communicate with another congestion control device associated with another network node, the control action as identified by consultation of said action table, and further configured to, in case conflicting control actions arise, implement a further heuristic control for adapting the next accepted layers quantity.

15. The apparatus of claim 10 wherein said network node comprises the congestion control device.

16. The apparatus according to claim 10, wherein the network includes a network congestion controller configured to communicate with the congestion control device, configured to determine said action table, and configured to communicate said action table to said congestion control device.

17. The apparatus according to claim 16, wherein the network congestion controller is configured to update said action table based on observed traffic and configured to provide said updated action table to said congestion control device.

18. The apparatus according to claim 10 wherein the identified control action includes an increase action, a decrease action, or a "no change" action.

19. An apparatus for congestion control at a network node in a network, the apparatus comprising:
    - a congestion control device configured to monitor incoming flows to a network node to identify a flow quantity, each incoming flow including multiple layers representative of a basic quality layer and one or more quality enhancement layer, the multiple layers including layer identifiers indicating an order of importance of the layers for the corresponding incoming flow;
    - wherein the congestion control device is configured to consult an action table to identify a control action based on the flow quantity;
    - wherein the congestion control device is configured to determine a next accepted layers quantity based on the identified control action and a current accepted layers quantity;
    - wherein the congestion control device is configured to identify specific layers in each incoming flow that relate to the next accepted layers quantity based on the layer identifiers;
    - wherein the congestion control device is configured to allow packets from the specific layers of the incoming flows related to the next accepted layers quantity to pass through the network node during a next time period.

20. The apparatus according to claim 19 wherein the identified control action includes an increase action, a decrease action, or a "no change" action.

21. The apparatus according to claim 19 wherein the congestion control device is configured to identify specific layers in each incoming flow that relate to the next accepted layers quantity based on the layer identifiers.

22. The apparatus according to claim 21 wherein the congestion control device is configured to allow packets from the specific layers of the incoming flows related to the next accepted layers quantity to pass through the network node during a next time period.

* * * * *